United States Patent [19]

Inoue

[11] 4,353,785
[45] Oct. 12, 1982

[54] METHOD OF AND APPARATUS FOR WIRE-CUT MACHINING WORKPIECES OF NON-PLANAR SURFACE CONTOURS

[75] Inventor: Kiyoshi Inoue, Tokyo, Japan

[73] Assignee: Inoue-Japax Research Incorporated, Yokohama, Japan

[21] Appl. No.: 75,231

[22] Filed: Sep. 13, 1979

[30] Foreign Application Priority Data

Sep. 26, 1978 [JP] Japan .................................. 53/118458

[51] Int. Cl.³ ............................ B23P 1/00; B23P 1/12
[52] U.S. Cl. ................................. 204/129.2; 204/206; 204/224 M; 204/225; 219/69 W; 83/565; 83/651.1
[58] Field of Search .................... 204/129.2, 206, 211, 204/225, 224 M; 219/69 W; 125/21, 16 F; 83/651.1, 565

[56] References Cited

U.S. PATENT DOCUMENTS

| | | | |
|---|---|---|---|
| 2,866,448 | 12/1958 | Dessureau et al. .................... | 125/21 |
| 2,974,216 | 3/1961 | Inoue ................................ | 219/69 W |
| 3,479,479 | 11/1969 | O'Connor ......................... | 219/69 W |
| 3,507,075 | 4/1970 | Schmidt .......................... | 51/165.72 |
| 3,642,601 | 2/1972 | Kondo ....................... | 204/224 M X |
| 4,101,405 | 7/1978 | Inoue .......................... | 204/129.2 X |
| 4,114,015 | 9/1978 | Vasiliev et al. .................. | 219/69 W |

FOREIGN PATENT DOCUMENTS

| | | | |
|---|---|---|---|
| 2443841 | 3/1976 | Fed. Rep. of Germany ... | 219/69 W |
| 1078573 | 8/1967 | United Kingdom ............ | 219/69 W |
| 504466 | 4/1976 | U.S.S.R. .......................... | 219/69 W |

*Primary Examiner*—Delbert E. Gantz
*Assistant Examiner*—Donald R. Valentine
*Attorney, Agent, or Firm*—Karl F. Ross

[57] ABSTRACT

A workpiece of a non-planar, curved or intricate surface contour carried on a horizontal table is wire-machined with a vertical swivel head for traveling-wire tool by sensing an imaginary plane which is tangent to the surface contour at any point thereon to be successively substantially intersected by the axis of the traveling-wire tool; and tilting the head to cause the axis of the traveling-wire tool transversing the workpiece to be oriented at a predetermined angle, preferably 90°, relative to the said plane substantially at the said point so as to maintain substantially the predetermined orientation of the traveling-wire tool relative to the surface contour, irrespective of change in the inclination of the tangential plane relative to the horizontal plane from point to point, throughout a substantial portion of the entire machining operation.

10 Claims, 3 Drawing Figures

METHOD OF AND APPARATUS FOR WIRE-CUT MACHINING WORKPIECES OF NON-PLANAR SURFACE CONTOURS

FIELD OF THE INVENTION

The present invention relates generally to wire-cut machining and, more particularly, to an improved method of and apparatus for the wire-cut machining of a workpiece with a non-planar, curved or intricate surface contour.

BACKGROUND OF THE INVENTION

Wire-cut machines commonly in use make use of a wire or like thin, continuous elongate tool. In such machines the wire is continuously unrolled from a supply reel and rolled on a take-up reel. In the path between the supply and take-up reels there are provided a pair of wire support or guide members defining a machining zone therebetween in which a workpiece or a portion of the workpiece to be machined is located. The support members act to stretch the wire traveling between them under suitable tension and to precisely position the traveling wire in a machining relationship with the workpiece.

In non-contact processes the wire is electrically conductive and forms an electroerosion electrode and an electric energy is supplied between the traveling wire and the workpiece across a machining gap filled with a liquid dielectric or electrolyte to electrophysically or electrochemically remove material from the workpiece. In the contact-type process, machining is carried out typically in the presence of an abrasive medium which is attached to or distributed over the wire surface or otherwise introduced in suspension with a machining fluid into the machining gap between the traveling wire and the workpiece.

As material removal proceeds, the workpiece carried on the machining table or bed is displaced relative to the traveling wire along a prescribed cutting path until a desired contour is formed in the workpiece.

Heretofore, the technique described has been applied generally with a fixed wire-support assembly relative to the carriage supporting the workpiece irrespective of a change in surface contour of the workpiece oriented relative to the axis of the traveling wire. As a result, when the workpiece involves a curved, intricate or, generally, a non-planar surface contour, a change takes place in relative orientation between the axis of the traveling wire and the workpiece surface in the course of machining operation. It has now been found that this change is diadvantageous since it creates a deviation in the machined shape and amount from portion to portion which leads to a machining result which is unsatisfactory both in accuracy or performance.

OBJECTS OF THE INVENTION

It is, accordingly, an object of the present invention to provide a method of wire-cut machining of a workpiece with a non-planar surface contour whereby an increased machining precision and better cutting performance are obtained over the entire workpiece region.

Another object of the invention is to provide an improved wire-cut machining apparatus of the type described and adapted to machine workpieces of non-planar surface contours with an increased machining precision and superior cutting performance.

SUMMARY OF THE INVENTION

In accordance with the present invention there is provided a method of the wire-cut machining of a workpiece having a non-planar surface contour with a wire or like thin, continuous elongate tool traveling between a supply side and take-up side and adapted to traverse the workpiece, the method comprising the steps of: instantaneously sensing an imaginary plane which is tangent to the surface contour of the workpiece at any point thereon to be successively substantially intersected by the axis of the traveling elongate tool traversing the workpiece, orienting the axis of the travelling elongate tool at a predetermined angle relative to the said imaginary plane substantially at the said point, and maintaining substantially the said predetermined orientation of the traveling elongate tool relative to the surface contour, in spite of change in the tangent plane from point to point thereon relative to a fixed plane, throughout a substantial portion of the entire machining operation. The angular orientation is preferably set to hold the axis of the traveling elongate tool substantially perpendicular to the tangential plane on each point on the surface contour.

An apparatus according to the invention comprises means for instantaneously sensing an imaginary plane which is tangent to a non-planar workpiece surface contour at any point thereon to be successively substantially intersected by the axis of the traveling elongate tool traversing the workpiece, and means for orienting the axis of the traveling elongate tool at a predetermined angle, preferably a right angle, relative to the said imaginary plane substantially at the said point so as to substantially maintain the said predetermined orientation of the traveling elongate tool relative to the surface contour, in spite of change in the tilt of the tangential plane from point to point thereon relative to a fixed plane, throughout a substantial portion of entire machining operation.

BRIEF DESCRIPTION OF DRAWING

The invention is described hereinafter with reference to the accompanying drawing in which.

SPECIFIC DESCRIPTION

Figure 1:
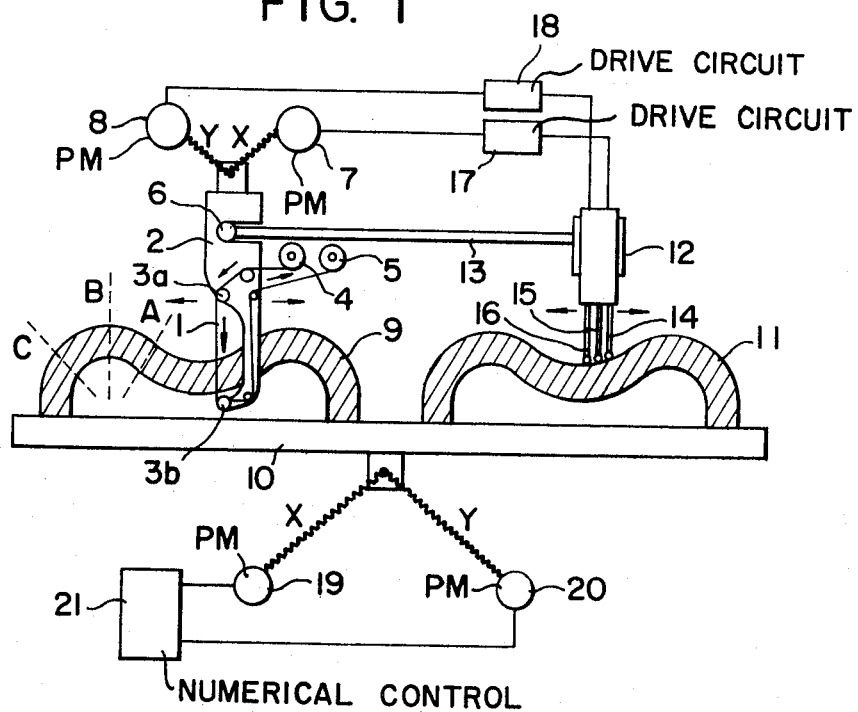
FIG. 1 is a schematic view partly in section diagrammatically illustrating a certain embodiment thereof.

In FIG. 1, a wire or like thin, continuous elongate tool 1 (hereinafter referred to as "wire tool") is shown to be carried by a bow-shaped or C-shaped tool head 2 between a pair of wire-positioning guide members 3a and 3b attached thereon and transported between a supply reel 4 and a take-up reel 5 which are shown mounted separately from the tool head 2 but may also be carried by the latter. Although not specifically designated, usual drive and brake rollers are also shown provided on the tool head 2 to apply an axial drive and traction on the wire tool 1 so that the latter may smoothly travel between the guide members 3 and 4 at a predetermined rate under a suitable tension.

The tool head 2 is pivotally supported for swivel movement on a fulcrum constituted by a ball bearing 6 and is tilted by a drive arrangement including carriages 7 and 8 with respective associated drive motors for angular displacements of angle $\theta$ in a given plane and of angle $\phi$ in a plane normal thereto, respectively. The tool head 2 may thus assume any angular positions relative to a workpiece 9 fixedly mounted on a worktable or bed 10.

The embodiment of FIG. 1 is designed to sense the surface contour of the workpiece 9 by sensing a copying model 11 prepared to reproduce the contour of the workpiece 9 in shape or both in shape and size. The model 11 is mounted on the table or bed 10 and thus sensed by a sensing head 12 coupled by a link 13 to the ball bearing 6 supporting the tool head 2. The sensing head 12 is shown having three feeler pins or fingers 14, 15 and 16 located at the vertices of a regular triangle in a closed-spaced relationship to surround the axis of the head 12 at a small distance therefrom. The fingers 14, 15 and 16 are individually spring-biased in the head 12 to each bear against the model 11 and follow the surface contour thereof to define an imaginary plane tangent to the model surface at the point at which the axis of the head intersects.

The sensing head 12 contains suitable position-signal transducers, e.g. linear differential transformers (not shown) associated with the fingers 14, 15 and 16 for producing sensing electrical signals representing the imaginary tangential plane sensed at each point on the model, the signals being converted into angular components $\theta$ and $\phi$ received at respective amplifier/driver circuits 17 and 18 which energize the $\theta$ and $\phi$ angular drive units 7 and 8 noted previously to control the angular position of the tool head 2. The table or bed 10 is driven by a conventional cross-feed arrangement including carriage 19 and 20 driven respectively along the x and y coordinates in response to command signals from a numerical controller 21 to follow a desired cutting path.

For operation, the workpiece 9 and the model 11 are fixedly mounted at prescribed locations to the same postures on the table 10. The tool head 2 and the sensing head 12 are then juxtaposed respectively with the workpiece 9 and the model 11 so that the axis of the wire 1 and the axis of the sensing head may alway be located to intersect corresponding regions on the workpiece 9 and model 11 surfaces as the table 10 carrying the workpiece 9 and the model 11 is displaced by the machining feed drives 19 and 20 in response to command signals of the numerical controller 21.

In electroerosion or electrical discharge machining, a series of electrical pulses are applied from a power supply (not shown) between the wire tool 1 which, traveling stretched between the guide members 3a and 3b under suitable tension, forms a tool electrode and the workpiece 9 which forms a counterelectrode to effect a succession of electrical discharges across a machining gap formed between the electrodes while a machining medium such as distilled water is supplied to the region of the machining gap. By displacing the workpiece 9 transversely relative to the traveling wire 1 to follow the machining action at the gap along a programmed cutting path, a desired machining result is obtained.

The present invention permits such machining to be executed with an increased accuracy, even when the workpiece 9 is of an intricate or non-planar type as illustrated in the drawing in the form of a combination of convex and concave contours.

In the embodiment of FIG. 1 the sensing head 12 is used to sense instantaneous contour of the workpiece 9 by following on the model 11 patterned to duplicate the surface contour of the workpiece 9. The feeler pins or fingers 14, 15 and 16 on the tip of the sensing head 12 are individually urged to lie always in contact with the model 11 surface so that their respective axial displacements provide sensing signals representing an inclination relative to the horizontal plane of an imaginary plane which is tangent to the surface contour at the sensing area. The signals defining this imaginary tangent plane are thus derived wherefrom the normal to the tangent plane is deduced. The signals defining the normal with respect to a given vertical plane or the above horizontal plane in terms of divided $\theta$ and $\phi$ angular components are then issued from the sensing system 12 and applied to the respective $\theta$ and $\phi$ drive circuits 17 and 18 where they are converted into the corresponding trains of drive pulses for the $\theta$ and $\phi$ pulse motors 7 and 8 to rotate the tool head 2 about the fulcrum 6 through the directed angular displacement. This results in the orientation of the wire tool 1 with its axis maintained always perpendicular to an imaginary plane which is tangent to the surface contour of the workpiece 9 instantaneously sensed by way of the model 11, regardless of the instantaneous change in the inclination of the surface contour of the workpiece 9 with respect to the horizontal or vertical plane, which occurs while the table 10 is being displaced in accordance with a machining feed. The change of orientation of the controlled wire axis 1 in accordance with the changed contour is illustrated by broken lines A, B and C. As a consequence, material removal is equalized on and toward both upper and lower surfaces of the workpiece 9, thereby yielding an increased cutting accuracy over the entire machining area. Furthermore, the removal of the machining medium and chip-removal action over the entire cutting width are facilitated and equalized to stabilize the production of machining discharges, thereby leading to an improved removal rate and cutting efficiency.

Figure 2:
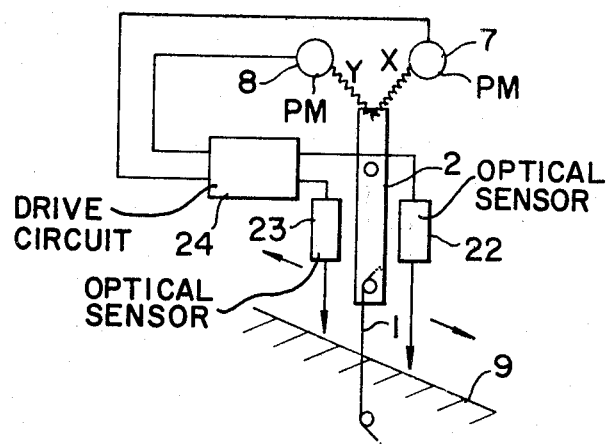
FIGS. 2 and 3 are similar views diagrammatically illustrating modified embodiments according to the invention.

In an embodiment of FIG. 2 an optical copying head is employed comprising a plurality of optical sensors of which two are shown at 22 and 33 and which are located to surround the tool head 2 which carries the wire tool 1 as described in FIG. 1. The optical sensors 22, 23 are designed in a known manner to radiate optical rays against the surface of the workpiece 9 and upon sensing the respective reflected rays, to detect and define the imaginary tangent plane in the radiated area on the workpiece 9 surface in the form of electrical signals. The latter are, as in the previous embodiment, fed to a drive circuit 24 to rotate the tool head 2 about the fulcrum 6 to orient the axis of wire tool 1 perpendicular to the contour of the workpiece 9.

Figure 3:
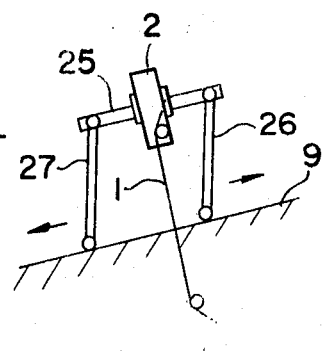

In a further embodiment illustrated in FIG. 3 a link mechanism is provided having a pair of parallel bars 26 and 27 pivotally coupled with another bar 25 designed to lie in parallel with the surface contour (with the tangential plane thereof) and having the tool head 2 mounted thereto. The parallel bars 26 and 27 have their tips moved in contact over the surface and the tool head 2 is fixedly oriented on the bar 25 with the axis of the wire tool 1 lying perpendicular to the bar 25 and the imaginary tangent plane on the surface in question. Thus, by permitting the head 2 to be displaced over the surface while maintaining the vertical or preset orientation of the bars 26 and 27, the perpendicularity of the wire tool 1 with respect to the machined surface contour is maintained.

It is sometimes desirable to orient the axis of the wire tool 1 at an angle other than 90° with respect to the contour of the workpiece 9. It should also be appreciated that the invention is applicable equally to a diverse range of wire-cut machining operations involving abrasive, electrochemical and electrical-discharge machining actions and combinations of the these actions.

What is claimed is:

1. A method of the wire-cut machining of a workpiece having a non-planar surface contour with a thin, continuous elongate tool traveling between a pair of tool-positioning and machining guide members from a supply side to a take-up side and adapted to traverse, between said guide members and through said workpiece, the workpiece transversely to said surface contour, the method comprising the steps of:

sensing an imaginary plane which is tangent to said surface contour of the workpiece at any point thereon to be successively substantially intersected by the axis of said traveling elongate tool;

automatically, in response to the sensing of said imaginary plane of said surface contour, orienting the axis of said traveling elongate tool traversing the workpiece at a predetermined angle relative to said imaginary tangential plane substantially at said point; and automatically maintaining substantially said predetermined orientation of the traveling elongate tool traversing said workpiece relative to said surface contour, in spite of change in the tangential plane from point to point relative to a fixed plane, throughout a substantial portion of the entire machining operation.

2. The method defined in claim 1 wherein said angle is substantially 90°.

3. The method defined in claim 1 wherein said tangential plane of the workpiece surface contour is sensed by juxtaposing a sensing head with said workpiece or a model thereof.

4. The method defined in claim 3 wherein said sensing head comprises a contact stylus assembly.

5. The method defined in claim 3 wherein said sensing head comprises an optical-electrical transducer assembly.

6. The method defined in claim 3 wherein said guide members are securely mounted on a movable tool head mechanically coupled in a linkage assembly with said sensing head adapted to engage in the surface of said workpiece or a model thereof, said method further comprising orienting automatically said tool head in response to the orientation of said linkage assembly.

7. An apparatus for the wire-cut machining of a workpiece having a non-planar surface contour with a wire or the like thin, continuous elongate tool traveling between a pair of tool-positioning and machining guide members from a supply side to a take-up side and adapted to traverse, between said guide members, the workpiece transversely to said surface contour, the apparatus comprising:

means for sensing an imaginary plane which is tangent to said surface contour of the workpiece at a point thereon to be successively substantially intersected by the axis of said traveling elongate tool traversing said workpiece, and means for orienting the axis of said traveling plane substantially at said point so as to substantially maintain said predetermined orientation of said traveling elongate tool relative to said surface contour, in spite of change of orientation of the tangential plane from point to point thereon relative to a fixed plane, throughout a substantial portion of entire machining operation.

8. The apparatus defined in claim 7 wherein said guide members are securely mounted on a tool head and said sensing means includes a sensing head for scanning non-planar surface contour of said workpiece or a model thereof to define said tangent plane and means for deriving electrical signals representing the sensed plane, said orienting means including drive means in response to said electrical signals for tilting said tool head to cause it to assume a position in which said elongate tool is kept oriented substantially at said angle relative to the tangent to said surface contour of the workpiece.

9. The apparatus defined in claim 7 wherein said sensing means comprises a linkage assembly adapted for engagement with the surface contour of said workpiece or of a model thereof to automatically orient said traveling elongate tool in response to the orientation of said linkage assembly.

10. The apparatus for the wire-cut machining of a workpiece having a non-planar surface contour with a wire or the like thin, continuous elongate tool traveling between a supply side and a take-up side and adapted to traverse the workpiece, the apparatus comprising:

means for sensing an imaginary plane which is tangent to said surface contour at a point thereon to be successively substantially intersected by the axis of said traveling elongate tool traversing said workpiece; and means for orienting the axis of said traveling elongate tool at a predetermined angle relative to said tangential plane substantially at said point so as to substantially maintain said predetermined orientation of said traveling elongate tool relative to said surface contour, in spite of change of orientation of the tangential plane form point to point thereon relative to a fixed plane, throughout a substantial portion of entire machining operation, said traveling elongate tool being guided between a pair of support members mounted on a swivel head, the head being tiltable about a fulcrum in response to said sensing means.

* * * * *